United States Patent

Haas et al.

[11] Patent Number: 4,797,430
[45] Date of Patent: Jan. 10, 1989

[54] AMINE-MODIFIED POLYURETHANE (UREA) FOAMS AND A PROCESS FOR THEIR PRODUCTION

[75] Inventors: Peter Haas, Haan; Hans-Joachim Kogelnik, Cologne, both of Fed. Rep. of Germany

[73] Assignee: Bayer Aktiengesellschaft, Leverkusen, Fed. Rep. of Germany

[21] Appl. No.: 57,473

[22] Filed: Jun. 3, 1987

[30] Foreign Application Priority Data

Jun. 19, 1986 [DE] Fed. Rep. of Germany ....... 3620504

[51] Int. Cl.⁴ .................... C08G 18/00; C08G 18/14; C08J 9/00
[52] U.S. Cl. ........................... 521/164; 521/163; 521/157; 521/118; 521/128
[58] Field of Search .............. 521/163, 164, 157, 166, 521/118, 128

[56] References Cited

U.S. PATENT DOCUMENTS

| | | | |
|---|---|---|---|
| 3,660,326 | 5/1972 | Mallabar | 521/163 |
| 4,136,241 | 1/1979 | Ammann | 521/163 |
| 4,334,944 | 6/1982 | Creyf | 521/164 |
| 4,530,941 | 7/1985 | Turner et al. | 521/163 |
| 4,585,804 | 4/1986 | Lancaster et al. | 521/164 |
| 4,642,320 | 2/1987 | Turner et al. | 521/163 |

FOREIGN PATENT DOCUMENTS 0128636 12/1984 European Pat. Off. .
1384771  2/1975 Fed. Rep. of Germany .
1365567  9/1974 United Kingdom .

OTHER PUBLICATIONS

CA 104:207860s.
CA 104:207861t.
CA 95:132278t.

Primary Examiner—John Kight
Assistant Examiner—Dennis R. Daley
Attorney, Agent, or Firm—Gene Harsh; Joseph C. Gil; Richard E. L. Henderson

[57] ABSTRACT

Amine-modified polyurethane (urea) foams are made by reacting a polyisocyanate with a relatively high molecular weight isocyanate-reactive compound in the presence of a difunctional and/or polyfunctional amine corresponding to the formula(e)

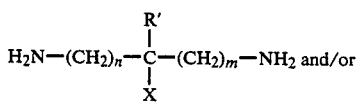

and/or

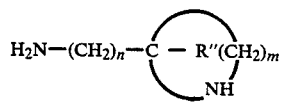

in which X, R', R", m and n each represent specified groups or values. The amine is used in a quantity of from 0.01 to 5 parts by weight for every 100 parts by weight relatively high molecular weight isocyanate-reactive compound. Known additives and auxiliaries may also be included in the reaction mixture. The foams thus produced are characterized by improved mechanical properties and reduced amine odor. These foams are usefuel as cushioning materials, insulating materials, coatings and elastomeric materials.

19 Claims, No Drawings

AMINE-MODIFIED POLYURETHANE (UREA) FOAMS AND A PROCESS FOR THEIR PRODUCTION

BACKGROUND OF THE INVENTION

This invention relates to polyurethane (urea) foams and a process for their production.

Certain amines have been used as crosslinking agents in the production of polyisocyanate-based polyurethane (urea) foams. These amines are generally polyalkylene polyamines of relatively high functionality, such as diethylene triamine, triethylene tetramine, tetraethylene pentamine, pentaethylene hexamine and mixtures thereof. Amines of this type are described in detail in DE-B 2,103,730 These polyalkylene polyamines have raised the standards of polyurethane foams Nevertheless, polyurethane (urea) foams produced on an industrial scale could still be improved with respect to mechanical properties such a compression hardness, elongation at break, tensile strength and compression set.

Physiological concerns during the production of such foams could also be further reduced The production of polyurethane (urea) foam moldings using the above-described polyalkylene polyamines (generally distillation cuts of these oligomeric products) is accmpanied by the emission of objectionable odors

SUMMARY OF THE INVENTION

It is an object of the present invention to provide amine-modified polyurethane (urea) foams having improved mechanical properties.

It is also an object of the present invention to provide a process for the production of aminemodified polyurethane (urea) foams having improved mechanical properties which satisfy industrial hygiene standards.

It is a further object of the present invention to provide low shrinkage polyurethane (urea) foams having increased compression hardness, improved elongation at break and tensile strength, reduced compression set and better behavior with respect to vapor emanation.

It is another object of the present invention to provide a process for producing polyurethane (urea) foams in which an amine having a greater reactivity than previously used amines is employed.

These and other objects which will be apparent to those skilled in the art are accomplished by including from 0.01 to 5 parts by weight of an at least difunctional amine corresponding to the formula $$H_2N-(CH_2)_n-\underset{X}{\overset{R'}{\underset{|}{C}}}-(CH_2)_m-NH_2 \text{ and/or}$$

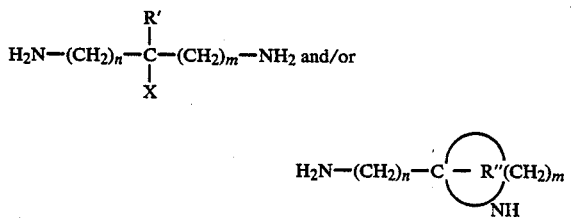

in which X, R', R", m and n each represent specified groups or values are included in a polyurethane foam forming reaction mixture for every 100 parts by weight of isocyanatereactive compound with a molecular weight of from 400 to 10,000 in that reaction mixture.

DETAILED DESCRIPTION OF THE INVENTION

The present invention relates to polyurethane (urea) foams and a process for their production. More particularly, the present invention relates to polyurethane (urea) foams produced from polyurethane foam forming reaction mixtures which include a specific type of polyamine. These polyamines are difunctional, trifunctional and higher amines or amine mixtures which are not related to polyalkylene polyamines and which correspond to general formula (I) and/or (II) below:

$$H_2N.(CH_2)_n\underset{X}{\overset{R'}{\underset{|}{C}}}-(CH_2)_m.NH_2 \quad (I)$$

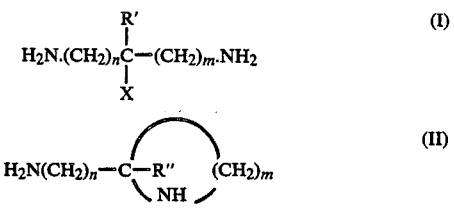

in which n and m independently of one another are integers of from 2 to 10 (preferably from 3 to 8, more preferably 5), X represents —OH, —NH$_2$, or —(CH$_2$)$_m$.NH$_2$, R' represents —H, —C$_1$-C$_5$-alkyl (preferably methyl) or $$-(CH_2)_n.\underset{NH_2}{\overset{}{\underset{|}{CH}}}(CH_2)_m.NH_2$$

and

R" represents —H,

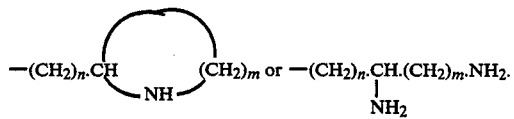

Bifunctional amines are capable of disrupting the buildup of a cellular structure to the extent that their presence results in foam collapse because the unstable cell structures formed completely break down through premature opening. The effect of the difunctional and-/or higher amines used in accordance with the invention was therefore surprising. In addition to outstanding mechanical properties (such as the considerably improved compression hardness, elongation at break and tensile strength), the foams of the present invention are substantially odorless when removed from the mold immediately after the foam forming reaction. In overall terms, these properties represent a significant technical advance.

The following are examples of specific polyfunctional amines useful in the practice of the present invention:

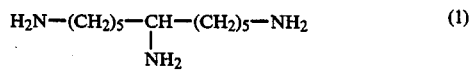

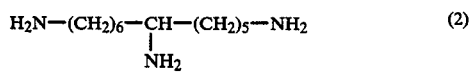

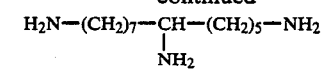

(3)

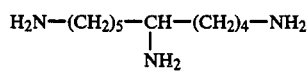

(4)

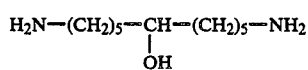

(5)

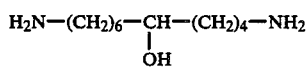

(6)

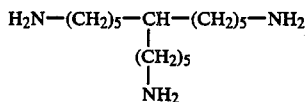

(7)

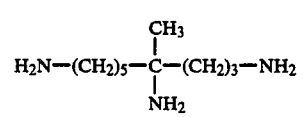

(8)

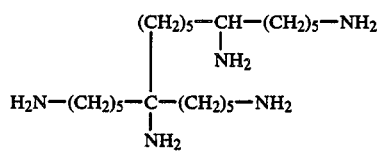

(9)

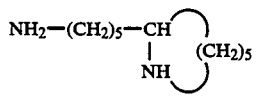

(10)

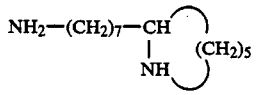

(11)

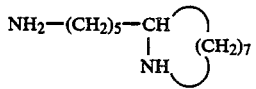

(12)

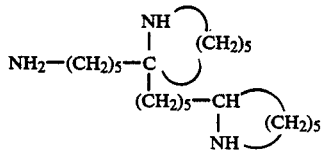

(13)

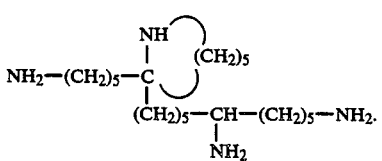

(14)

These amines are liquid polyamines which are substantially odorless. Their major advantages are production of polyurethane (urea) foams having considerably improved mechanical properties and of substantially odorless moldings. Even moldings which are still warm from the heat of reaction immediately after mold release are substantially odorless. This is of enormous importance so far as industrial hygiene is concerned.

Another important advantage of these amines is their ability both to activate the polyurethane-forming reaction and to influence the build-up of the cellular structure. They also have a cell-opening effect so that there is no need to use additional cell openers.

Compounds corresponding to formulae 1 and 10 are preferred. In some cases, compounds corresponding to formulae 9, 13, and 14 may also be preferred. Mixtures of these amines may also be used.

In the present invention, polyurethane (urea) foams are produced by reacting a relatively high molecular weight compound having a molecular weight of from 400 to 10,000 and containing at least 2 isocyanate-reactive hydrogen atoms with a polyisocyanate and amine. Water and/or organic blowing agents and other known catalysts, surface-active or flameproofing additives or chain-extending agents having a molecular weight of from 32 to 399 may optionally be present during this reaction. A difunctional or higher amine corresponding to general formula(e) (I) and/or (II) above must be used as an activating, cell-opening crosslinking agent in a quantity of from 0.01 to 5.0 parts by weight (preferably from 0.05 to 0.6 parts by weight) for every 100 parts by weight of the relatively high molecular weight isocyanate-reactive compound having a molecular weight of from 400 to 10,000.

Predominantly open-cell polyurethane (urea) foams are obtained by the process of the present invention. These foams contain a difunctional and/or higher amine corresponding to general formula(e) (I) and/or (II) above in quantities of from 0.01 to 5.0 parts by weight (preferably from 0.05 to 0.6 parts by weight) for every 100 parts by weight of the relatively high molecular weight isocyanate reactive compound.

The isocyanate starting materials useful in the process of the present invention for the production of polyurethane (urea) foams, preferably foam moldings include: aliphatic, cycloaliphatic, araliphatic, aromatic and heterocyclic diisocyanates and/or polyisocyanates of the type described, for example, by W. Siefken in Justus Liebigs Annalen der Chemie, 562, pages 75 to 136. For example, those isocyanates corresponding to the formula $Q(NCO)_n$ where n=2 to 4, preferably 2, and Q represents an aliphatic hydrocarbon radical containing from 2 to 18 (preferably from 6 to 10) C-atoms, a cycloaliphatic hydrocarbon radical containing from 4 to 15 (preferably from 5 to 10) C-atoms, an aromatic hydrocarbon radical containing from 6 to 15 (preferably from 6 to 13) C-atoms or an araliphatic hydrocarbon radical containing from 8 to 15 (preferably from 8 to 13) C-atoms may be used. Specific examples of such isocyanates include: ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3- and -1,4-diisocyanate and mixtures of these isomers, 1-isocyanato-3,3,5-trimethyl-5-isocyanato-methyl cyclohexane (DE-B No. 1,202,785, U.S. Pat. No. 3,401,190), 2,4- and 2,6-hexahydrotolylene diisocyanate and mixtures of these isomers, hexahydro-1,3- and/or -1,4-phenylene diisocyanate, perhydro-2,4'- and/or -4,4'-di-phenylmethane diisocyanate, 1,3- and 1,4-phenylene diisocyanate, 2,4- and 2,6-tolylene diisocyanate and mixtures of these isomers, diphenylmethane-4,4'- and/or -2,2'- and/or -2,4'-diisocyanate and mixtures of these isomers and naphthylene-1,5-diisocyanate.

It is also possible to use triphenylmethane-4,4',4''-trisocyanate: polyphenyl-polymethylene polyisocyanates of the type obtained by phosgenation of aniline-formaldehyde condensates and described, for example, in GB-B No. 874,430 and 848,671: m- and p-isocyanatophenyl sulfonylisocyanates according to U.S. Pat. No. 3,454,606: perchlorinated aryl polyisocyanates of the type described, for example, in DE-B No. 1,157,601 (U.S. Pat. No. 3,277,138); polyisocyanates containing carbodiimide groups of the type described, for example, in DE-C No. 1,092,007 (U.S. Pat. No. 3,152,162) and in DE-A Nos. 2,504,400, 2,537,685 and 2,552,350: norbornane diisocyanates; polyisocyanates containing allophanate groups of the type described, for example, in GB-B No. 994,890, in BE-A No. 761,626 and in NL-A No. 7,102,525; polyisocyanates containing isocyanurate groups of the type described, for example, in U.S. Pat. No. 3,001,973, in DE-C Nos. 1,022,789, 1,222,067 and 1,027,394 and in DE-A Nos. 1,929,034 and 2,004,048; polyisocyanates containing urethane groups of the type described, for example, in BE-A No. 752,261 and in U.S. Pat. Nos. 3,394,164 and 3,644,457; polyisocyanates containing acylated urea groups according to DE-E No. 1,230,778; polyisocyanates containing biuret groups of the type described, for example, in U.S. Pat. Nos. 3,124,605, 3,201,372 and in GB-B No. 889,050; polyisocyanates prepared by telomerization reactions of the type described, for example in U.S. Pat. No. 3,654,106; polyisocyanates containing ester groups of the type mentioned, for example, in GB-B Nos. 965,474 and 1,072,956, in U.S. Pat. No. 3,567,763 and in DE-C No. 1,231,688; reaction products of the above-mentioned isocyanates with acetals according to DE-C No. 1,072,385; and polyisocyanates containing polymeric fatty acid esters according to U.S. Pat. No. 3,455,883.

In general, it is particularly preferred to use commercially readily obtainable polyisocyanates such as 2,4- and 2,6-tolylene diisocyanate, and mixtures of these isomers ("TDI"); polyphenyl-polymethylene polyisocyanates of the type obtained by phosgenation of aniline-formaldehyde condensates ("crude MDI"); and modified polyisocyanates containing carbodiimide groups, urethane groups, allophanate groups, isocyanurate groups, urea groups or biuret groups, particularly those modified polyisocyanates which are derived from 2,4- and/or 2,6-tolylene diisocyanates and from 4,4'- and/or 2,4'- and/or 2,2'-diphenylmethane diisocyanates or isomer mixtures thereof.

Suitable high molecular weight isocyanate-reactive starting components are compounds containing at least 2 isocyanate-reactive hydrogen atoms and having a molecular weight of generally from 400 to 10,000. In addition to compounds containing amino groups, thiol groups and/or carboxyl groups, it is preferred that compounds containing hydroxyl groups, more especially compounds containing from 2 to 8 hydroxyl groups, particularly those having molecular weights of from 1000 to 8000 and preferably from 1500 to 4000 be used. Such hydroxyl group containing compounds include polyesters, polyethers, polythioethers, polyacetals, polycarbonates and polyester amides containing at least 2, generally from 2 to 8, but preferably from 2 to 4 hydroxyl groups of the type known by those skilled in the art to be useful for the production of homogeneous and cellular polyurethanes.

The hydroxyl-group-containing polyesters suitable for use in accordance with the invention include: reaction products of polyhydric, preferably dihydric and, optionally, even trihydric alcohols with polybasic, preferably dibasic, carboxylic acids. Instead of using the free polycarboxylic acids, it is also possible to use the corresponding polycarboxylic acid anhydrides or corresponding polycarboxylic acid esters of lower alcohols or mixtures thereof for producing the polyesters. The polycarboxylic acids may be aliphatic, cycloaliphatic, aromatic and/or heterocyclic and may optionally be substituted, for example by halogen atoms, and/or unsaturated.

Examples of carboxylic acids such as these and derivatives thereof are: succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimerized and trimerized unsaturated fatty acids, optionally in admixture with monomeric unsaturated fatty acids, such as oleic acid, terephthalic acid dimethylester and terephthalic acid-bis-glycol ester.

Suitable polyhydric alcohols are, for example, ethylene glycol, 1,2- and 1,3-propane diol, 1,4- and 2,3-butane diol, 1,6-hexane diol, 1,8-octane diol, neopentyl glycol, 1,4-bis-hydroxymethylcyclohexane, 2-methyl-1,3-propane diol, glycerol, trimethylol propane, 1,2,6-hexane triol, 1,2,4-butane triol, trimethylolethane, pentaerythritol, quinitol, mannitol and sorbitol, formitol, 1,4,3,6-dianhydrous sorbitol, methylglycoside, diethylene glycol, triethylene glycol, tetraethylene glycol and higher polyethylene glycols, dipropylene glycol and higher polypropylene glycols and also dibutylene glycol and higher polybutylene glycols. The polyesters may also contain terminal carboxyl groups. Polyesters of lactones, for example $\epsilon$-caprolactone, or of hydroxycarboxylic acids, for example $\omega$-hydroxycaproic acid, may also be used.

The polyethers containing at least 2, generally 2 to 8 and preferably 2 to 3 hydroxyl groups suitable for use in accordance with the present invention are also known. These polyethers may be obtained, for example, by polymerization of epoxides (such as ethylene oxide, propylene oxide, butylene oxide, styrene oxide, or epichlorohydrin or tetrahydrofuran), for example in the presence of Lewis catalysts (such as $BF_3$) or by addition of these epoxides (preferably ethylene oxide and propylene oxide) optionally in admixture or successively, onto starter components containing reactive hydrogen atoms. Suitable starter components include: water; alcohols, for example, ethylene glycol, 1,3- or 1,2-propane diol, trimethylol propane, glycerol, sorbitol, 4,4'-dihydroxydiphenyl-propane; ammonia; and amines such as aniline, ethanolamine and ethylenediamine. It is also possible to use sucrose polyethers of the type described, for example, in DE-B Nos. 1,176,358 and 1,064,938 and also formitol- or formose-started polyethers (DE-A No. 2,639,083). In many cases, it is preferred to use polyethers containing predominantly primary OH-groups (up to 90% by weight, based on all the OH-groups present in the polyether). Polybutadienes containing OH-groups may also be used in accordance with the invention.

The polythioethers useful in the present invention include the condensation products of thiodiglycol on its own and/or with other glycols, dicarboxylic acids, formaldehyde, aminocarboxylic acids or aminoalcohols.

Suitable polyacetals are, for example, the compounds obtainable from glycols, such as diethylene glycol, triethylene glycol, 4,4'-dioxethoxydiphenyl dimethyl methane, hexane diol and formaldehyde. Polyacetals useful in the present invention may also be obtained by polymerization of cyclic acetals, such as trioxane.

Suitable polycarbonates containing hydroxyl groups are known to those skilled in the art and may be obtained, for example, by reacting a diol such as 1,3-propane diol, 1,4-butane diol and/or 1,6-hexane diol, diethylene glycol, triethylene glycol, tetraethylene glycol or thiodiglycol with a diarylcarbonate (for example diphenylcarbonate) or phosgene.

Appropriate polyester amides and polyamides include the predominantly linear condensates obtained for example from polybasic saturated or unsaturatd carboxylic acids or their anhydrides and polyhydric saturated or unsaturated aminoalcohols, diamines, polyamines and mixtures thereof.

Polyhydroxyl compounds already containing urethane or urea groups and optionally modified natural polyols (e.g. castor oil) or carbohydrates (e.g. starch) may also be used. Addition products of alkylene oxides with phenolformaldehyde resins or with urea-formaldehyde resins may also be used in the present invention.

Before they are used in the polyisocyanatepolyaddition process, the above-mentioned polyhydroxyl compounds may be modified in various ways. For example, DE-A No. 2,210,839 (U.S. Pat. Nos. 3,849,515 and 2,544,195) discloses that a mixture of different polyhydroxyl compounds (for example a polyether polyol and a polyester polyol) may be condensed by etherification in the presence of a strong acid to form a relatively high molecular weight polyol which is made up of different segments attached through ether bridges. It is also possible, according to DE-A No. 2,559,372, to introduce amide groups into the polyhydroxy compounds and according to DE-A No. 2,620,487 to introduce triazine groups by reacting a polyhydroxyl compound with polyfunctional cyanic acid esters. The reaction of a polyol with a less than equivalent quantity of a diisocyanatocarbodiimide, followed by reaction of the carbodiimide group with an amine, amide, phosphite or carboxylic acid, gives polyhydroxyl compounds containing guanidine, phosphonoformamidine or acyl urea groups (DE-A Nos. 2,714,289, 2,714,292 and 2,714,293). In some cases, it is of particular advantage to completely or partially convert the relatively high molecular weight polyhydroxyl compound into the corresponding anthranilic acid ester by reaction with isatoic acid anhydride, as described in DE-B Nos. 2,019,432 and 2,619,840 and in U.S. Pat. Nos. 3,808,250, 3,975,428 and 4,016,143. Relatively high molecular weight compounds containing terminal aromatic amino groups are obtained in this way. According to DE-A No. 2,546,536 and U.S. Pat. No. 3,865,791, relatively high molecular weight compounds containing terminal amino groups are obtained by reacting NCO prepolymers with enamines, aldimines or ketimines containing hydroxyl groups, followed by hydrolysis. Further processes for producing relatively high molecular weight compounds containing terminal amino groups or hydrazides are described in DE-A No. 1,694,15Z (U.S. Pat. No. 3,625,871) and in DE-B No. 3,266,392.

It is also possible to use polyhydroxyl compounds containing high molecular weight polyadducts and polycondensates or polymers in finely dispersed or dissolved form in the process of the present invention. Such polyhydroxyl compounds may be obtained, for example, by carrying out polyaddition reactions (for example reactions between polyisocyanates and aminofunctional compounds) and polycondensation reactions (for example between formaldehyde and phenols and/or amines) in situ in the above-mentioned compounds containing hydroxyl groups. Processes for the production of polyhydroxyl compounds are described, for example, in DE-B Nos. 1,168,075 and 1,260,142 and in DE-A Nos. 2,324,134, 2,423,984, 2,512,285, 2,513,815, 2,550,796, 2,550,797, 2,550,833, 2,550,862, 2,633,293 and 2,639,254. However, it is also possible, in accordance with U.S. Pat. No. 3,869,413 or DE-A No. 2,550,860, to mix an aqueous polymer dispersion with a polyhydroxyl compound and subsequently to remove the water from the mixture.

Polyhydroxyl compounds modified by vinyl polymers of the type obtained, for example, by polymerization of styrene and acrylonitrile in the presence of polyethers (U.S. Pat. Nos. 3,383,351, 3,304,273, 3,523,093, 3,110,695: DE-B No. 1,152,536) or polycarbonate polyols (DE-C No. 1,769,795; U.S. Pat. No. 3,637,909) are also suitable for use in the process of the present invention. Plastics having particularly good flame resistant properties are obtained by using polyether polyols modified (in accordance with DE-A Nos. 2,442,101, 2,644,922 and 2,646,141) by graft polymerization with vinyl phosphonic acid esters and, optionally, (meth)acrylonitrile, (meth)acrylamide or OH-functional (meth-)acrylates. Polyhydroxyl compounds into which carboxyl groups have been introduced by radical graft polymerization with unsaturated carboxylic acids and, optionally, other olefinically unsaturated monomers (DE-A Nos. 2,714,291, 2,739,620 and 2,654,746) may be used with particular advantage in combination with mineral fillers. Where modified polyhydroxyl compounds of the above-mentioned type are used as the starting component in the polyisocyanate-polyaddition process, polyurethane plastics having considerably improved mechanical properties are formed in many cases.

Representatives of the above-mentioned compounds useful in the practice of the present invention are also described, for example in High Polymers, Vol. XVI, "Polyurethanes, Chemistry and Technology", by Saunders-Frisch, Interscience Publishers, New York, London, Vol. I, 1962, pages 32–42 and pages 44–54 and Vol. II, 1964, pages 5–6 and 198–199, and in Kunststoff-Handbuch, Vol. VII, Vieweg-Hochtlen, Carl-Hanser-Verlag, Munich 1966, for example on pages 45–71. It is of course possible to use mixtures of the above-mentioned compounds containing at least two isocyanate-reactive hydrogen atoms and having a molecular weight of from 400 to 10,000, for example mixtures of polyethers and polyesters.

In some cases, it is of particular advantage to combine low-melting and high-melting polyhydroxyl compounds with one another (DE-A No. 2,706,297).

Compounds containing at least two isocyanate-reactive hydrogen atoms and having a molecular weight of from 32 to 399 may optionally be used as additional starting components. These compounds also contain hydroxyl groups and/or amino groups and/or thiol groups and/or carboxyl groups. Compounds containing hydroxyl groups and/or amino groups are preferred. These compounds act as chain extenders or cross-linkers. These compounds generally contain from 2 to 8 and preferably from 2 to 4 isocyanate-reactive hydrogen atoms. Mixtures of different compounds containing at least two isocyanate-reactive hydrogen atoms and having a molecular weight in the range from 32 to 399 may also be used.

Examples of such low molecular weight isocyanate reactive compounds include: ethylene glycol, 1,2- and 1,3-propanediol, 1,4- and 2,3-butanediol, 1,5-pentanediol, 1,6-hexanediol, 1,8-octanediol, neopentyl glycol, 1,4-bis-hydroxymethylcyclohexane, 2-methyl-1,3-propanediol, dibromobutenediol, glycerol, trimethylolpropane, 1,2,6-hexanetriol, trimethylolethane, pentaerythritol, quinitol, mannitol and sorbitol, castor oil, diethylene glycol, triethylene glycol, tetraethylene glycol, higher polyethylene glycols having a molecular weight up to 399, dipropylene glycol, higher polypropylene glycols having a molecular weight up to 399, dibutylene glycol, higher polybutylene glycols having a molecular weight up to 399, 4,4'-dihydroxydiphenylpropane, dihydroxymethyl hydroquinone, ethanolamine, diethanolamine, N-methyldiethanolamine, triethanolamine and 3-aminopropanol.

Specific aliphatic diamines suitable for use in small quantities include: ethylenediamine, 1,4-tetramethylenediamine, 1,11-undecamethylenediamine, 1,12-dodecamethylenediamine and mixtures thereof, 1-amino-3,3,5-trimethyl-5-aminomethylcyclohexane ("isophoronediamine"), 2,4- and 2,6-hexahydrotolylenediamine and mixtures thereof, perhydro-2,4'- and -4,4'-diaminodiphenylmethane, p-xylylenediamine, bis-(3-aminopropyl)-methylamine, diamino-perhydroanthracenes (DE-A No. 2,638,731) and cycloaliphatic triamines (DE-A No. 2,614,244). It is also possible to use hydrazine and substituted hydrazines such as methylhydrazine, N,N'-dimethylhydrazine and their homologs: acid dihydrazides, for example carbodihydrazide, oxalic acid dihydrazide, the dihydrazides of malonic acid, succinic acid, glutaric acid, adipic acid, β-methyl adipic acid, sebacic acid, hydracrylic acid and terephthalic acid; semicarbazido-alkylene hydrazides, such as for example β-semicarbazido-propionic acid hydrazide (DE-B No. 1,770,591): semicarbazido-alkylene carbazinic esters such as 2-semicarbazido-ethyl carbazinic ester (DE-A No. 1,918,504); and aminosemicarbazide compounds such as β-aminoethyl semicarbazido-carbonate (DE-A No. 1,902,931). The reactivity of the amino groups may be controlled by completely or partly blocking the amine groups with aldimine or ketimine groups (U.S. Pat. No. 3,734,894; DE-A No. 2,637,115).

Examples of low molecular weight aromatic diamines are bis-anthranilic acid esters (DE-A Nos. 2,040,644 and 2,160,590), 3,5- and 2,4-diaminobenzoic acid esters (DE-A No. 2,025,900), diamines containing ester groups (described in DE-A No. 1,803,635 (U.S. Pat. Nos. 3,681,290 and 3,736,350), 2,040,650 and 2,160,589), diamines containing ether groups (DE-A Nos. 1,770,525 and 3,736,295), 2-halogen-1,3-phenylenediamines optionally substituted in the 5-position, diethyl tolylenediamines or isomer mixtures thereof (DETDA), 3,3'-dichloro-4,4'-diaminodiphenylmethane, tolylenediamines, 2,3'-dichloro-3,3',5,5'-tetraethyl-4,4'-diaminodiphenylmethane, 4,4'-, 2,4'- and/or 2,2'-diaminodiphenylmethanes, 4,4'-diaminodiphenyldisulfides, diaminodiphenyldithioethers, aromatic diamines substituted by alkylthio groups, diaminobenzene phosphonic acid esters, aromatic diamines containing sulfonate or carboxylate groups and the high-melting diamines mentioned in DE-A No. 2,635,400. Examples of aliphatic-aromatic diamines are the aminoalkyl thioanilines according to DE-A No. 2,734,574.

Other suitable chain extenders are compounds such as 1-mercapto-3-aminopropane, optionally substituted amino acids (for example glycine, alanine, valine, serine and lysine) and optionally substituted dicarboxylic acids (for example succinic acid, adipic acid, phthalic acid, 4-hydroxyphthalic acid and 4-aminophthalic acid).

In addition, isocyanate-reactive monofunctional compounds may be used as so-called chain terminators in proportions of from 0.01 to 10% by weight, based on polyurethane solids. Monofunctional compounds such as these include monoamines such as butyl and dibutylamine, octylamine, stearylamine, N-methylstearylamine, pyrrolidine, piperidine and cyclohexylamine; monoalcohols such as butanol, 2-ethylhexanol, octanol, dodecaool: various amylalcohols; cyclohexanol and ethylene glycol monoethyl ether.

Auxiliaries and additives which may be used in the present invention include blowing agents, catalysts and surface-active additives.

Water and/or readily volatile inorganic or organic substances act as blowing agents. Organic blowing agents include: acetone, ethyl acetate, halogen-substituted alkanes, such as methylene chloride, chloroform, ethylidene chloride, vinylidene chloride, monofluorotrichloromethane, chlorotrifluoromethane, dichlorodifluoromethane, also butane, hexane, heptane, or diethyl ether. Inorganic blowing agents include air, $CO_2$ or $N_2O$. A blowing effect may also be obtained by adding compounds which decompose at temperatures above room temperature giving off a gas such as nitrogen (for example, azo compounds such as azodicarbonamide or azoisobutyronitrile). Other examples of blowing agents and information on the use of blowing agents can be found in Kunststoff-Handbuch, Vol. VII, by Vieweg and Hochtlen, Carl-Hanser-Verlag, Munich 1966, for example on pages 108 and 109, 453 to 455 and 507 to 510.

Known catalysts may also be used in the process of the present invention. Such catalysts include: tertiary amines such as triethylamine, tributylamine, N-methylmorpholine, N-ethylmorpholine, N,N,N',N'-tetramethylethylenediamine, pentamethyl-diethylenetriamine and higher homologs (DE-A Nos. 2,624,527 and 2,624,528), 1,4-diazabicyclo-(2,2,2)-octane, N-methyl-N'-dimethylaminoethylpiperazine, bis-(dimethylaminoalkyl)-piperazines, N,N-dimethylbenzylamine, N,N-dimethylcyclohexylamine, N,N-diethylbenzylamine, bis-(N,N-diethylaminoethyl)-adipate, N,N,N',N'-tetramethyl-1,3-butanediamine, N,N-dimethyl-phenylethylamine, 1,2-dimethylimidazole, 2-methylimidazole, monocyclic and bicyclic amidines, bis-(dialkylamino)-alkylethers and tertiary amines containing amide groups, preferably formamide groups (DE-A Nos. 2,523,633 and 2,732,292). Suitable catalysts further include known Mannich bases of secondary amines such as dimethylamine, and aldehydes, preferably formaldehyde, or ketones such as acetone, methylethylketone or cyclohexanone, and phenols such as phenol, nonylphenol or bisphenol.

Tertiary amines containing isocyanate-reactive hydrogen atoms suitable for use as catalysts include: triethanolamine, triisopropanolamine, N-methyldiethanolamine, N-ethyldiethanolamine, N,N-dimethanolamine, their reaction products with alkylene oxide (such as propylene oxide and/or ethylene oxide) and also secondary-tertiary amines according to DE-A No. 2,732,292.

Other suitable catalysts are silica-amines containing carbon-silicon bonds of the type described in DE-B No. 1,229,290 (corresponding to U.S. Pat. No. 3,620,984), for example 2,2,4-trimethyl-2-silamorpholine and 1,3-diethylaminomethyl tetramethyl disiloxane.

Other suitable catalysts are nitrogen-containing bases such as tetraalkylammonium hydroxides; alkali hydroxides such as sodium hydroxide: alkali phenolates such as sodium phenolate: and alkali alcoholates, such as sodium methylate. Hexahydrotriazines may also be used as catalysts (DE-A No. 1,769,043). Organometallic compounds, particularly organotin compounds, may also be used as catalysts. In addition to sulfur-containing compounds, such as di-n-octyltin mercaptide, preferred organotin compounds are tin(II) salts of carboxylic acids such as tin(II) acetate, tin(II) octoate, tin(II) ethylhexoate and tin(II) laureate, and the tin(IV) compounds such as dibutyltin oxide, dibutyltin dichloride, dibutyltin diacetate, dibutyltin dilaurate, dibutyltin maleate and dioctyltin diacetate.

All of the above-mentioned catalysts may of course be used in the form of mixtures. In this respect, combinations of organometallic compounds and amidines, aminopyridines or hydrazinopyridines (DE-A Nos. 2,434,185, 2,601,082 and 2,603,834) are of particular interest.

Further representatives of catalysts suitable for use in accordance with the invention and information on the way in which they work can be found in Kunststoff-Handbuch, Vol. VII, by Vieweg and Hochtlen, Carl-Hanser-Verlag, Munich 1966, for example on pages 96 to 102.

The catalyst if used, is generally used in a quantity of from about 0.001 to 10% by weight, based on the total quantity of compounds containing at least two isocyanate-reactive hydrogen atoms.

Surface-active additives, such as emulsifiers and foam stabilizers may also be used in the process of the present invention. Suitable emulsifiers are, for example, the sodium salts of castor oil sulfonates and salts of fatty acids with amines such as diethylamine oleate or diethanolamine stearate. Alkali or ammonium salts of the sulfonic acids (such as dodecylbenzene sulfonic acid or dinaphthylmethane disulfonic acid) or of fatty acids (such as ricinoleic acid) or of polymeric fatty acids may also be used as surface-active additives.

Suitable foam stabilizers include polyether siloxanes, particularly the water-soluble types. The structure of these compounds is generally such that a copolymer of ethylene oxide and propylene oxide is attached to a polydimethylsiloxane residue. Foam stabilizers such as these are described, for example, in U.S. Pat. Nos. 2,834,748, 2,917,480 and 3,629,308.

Reaction retarders, for example acid-reacting substances such as hydrochloric acid or organic acid halides; known cell regulators such as paraffins or fatty alcohols or dimethylpolysiloxanes; pigments or dyes; known flameproofing agents such as tris-chloroethylphosphate, tricresylphosphate or ammonium phosphate and polyphosphate: stabilizers against the effects of ageing and weather; plasticizers; fungistatic and bacteriostatic substances; and fillers, such as barium sulfate, kieselguhr, carbon black or whiting may also be present in the reaction mixture during the process of the present invention.

Further examples of surface-active additives and foam stabilizers, cell regulators, reaction retarders, stabilizers, flameproofing agents, plasticizers, dyes, fillers, fungistatic and bacteriostatic substances which may optionally be used in accordance with the invention and information on the way in which these additives are used and on their respective modes of action can be found in Kunststoff-Handbuch, Vol. VII, by Vieweg and Hochtlen, Carl-Hanser-Verlag, Munich 1966, for example on pages 103 to 113.

In the process of the present invention, the reaction components may be reacted by the known one-shot Process, by the prepolymer process or by the semi-prepolymer process. Suitable machinery is described in U.S. Pat. No. 2,764,565. Particulars of processing machines which may be used in accordance with the invention may be found in Kunststoff-Handbuch, Vol. VII, by Vieweg and Hochtlen, Carl-Hanser-Verlag, Munich 1966, for example on pages 121 to 205.

In the production of foams, it is also possible in accordance with the present invention to carry out foaming in closed molds. Suitable mold materials are metals, such as aluminum and plastics such as epoxy resins. The reaction mixture is introduced into a mold, foamable reaction mixture foams in the mold and forms the molding. In-mold foaming may be carried out in such a way that the molding has a cellular structure at its surface. It may also be carried out in such a way that the molding has a compact skin and a cellular core. It is possible in accordance with the invention to introduce foamable reaction mixture into the mold in such a quantity that the foam formed just fills the mold. However, it is also possible to introduce into the mold more foamable reaction mixture than is required for filling the interior mold with foam. This latter technique is known as overcharging and is described, for example, in U.S. Pat. Nos. 3,178,490 and 3,182,104.

In many cases, known "external release agents" such as silicone oils are used for in-mold foaming. However, it is also possible to use so-called "internal release agents", optionally in admixture with external release agents, of the type described in DE-A Nos. 2,121,670 and 2,307,589.

It is also possible to produce cold-hardening foams (see British Patent No. 1,162,517, DE-A No. 2,153,086) in accordance with the present invention.

It is of course also possible to produce foams by block foaming or by the known laminator process.

The products obtained by the process of the present invention may be used, for example, as automobile seats, upholstery materials, mattresses, insulating materials, coatings, elastomeric materials.

The invention is further illustrated but is not intended to be limited by the following examples in which all parts and percentages are by weight unless otherwise specified.

EXAMPLES

Synthesis of the Amine Cross-Linkers

Amine I

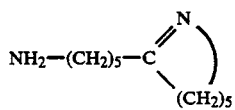

1130 g ε-caprolactam and 1200 g CaO were heated to 500° C. The reaction product was distilled off as it formed. The reaction product was then boiled under reflux with 1000 ml of a 20% sodium hydroxide, cooled and the upper phase purified by distillation.
Bp.: 120° to 123° C. at 3.5 mbar
Yield: 550 g (57% of the theoretical).
Amine II

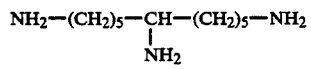

2.5 kg of Amine I were hydrogenated with 2 liters liquid ammonia and 350 g Raney nickel for 24 hours at 80° C. under a hydrogen pressure of 100 bar. After cooling, the reaction product was separated from the catalyst, freed from ammonia and distilled.
Yield: 2530 g (91% of the theoretical)
Bp.: 130° C. at 0.2 mbar
GC purity: 99.9%
Amine III

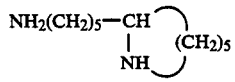

2.5 kg of Amine I were hydrogenated with 200 g Raney nickel for 20 hours at 70° C. under a hydrogen pressure of 180 bar. After cooling, the reaction product was separated from the catalyst and distilled.
Yield: 2320 g (92% of the theoretical)
Bp.: 90° C. at 0.1 mbar
GC purity: 99.9%
Amine IV

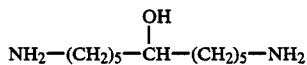

100 g of Amine I, 99 g water and 51 g ethanol were heated for 3 hours to 180° C. in 150 g concentrated KOH and hydrogenated in the presence of 20 g Raney nickel under a hydrogen pressure of 90 bar. The reaction product was then cooled and distilled.
Yield: 55 g (55% of the theoretical)
Bp.: 158° C. at 1.3 mbar.
Other Amines

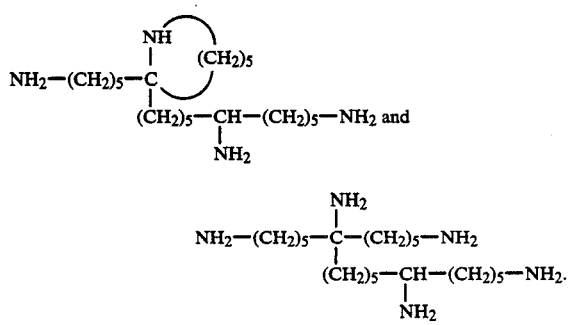

These amines were identified by gas chromatography coupled with mass spectrometry in the distillation residue formed during the production of Amine II.

Free foams and molded foams were produced by nown methods using the above-described crosslinking agents according to the present invention. The mechanical properties of the resulting foams were determined. In addition, reaction times of polyurethane reaction mixtures were measured by substitution of known activators, crosslinking agents and cell-opening agents for the species according to the invention so that the activity of these amines could be compared and their cell-opening effect determined from the absence of foam contraction.

The specific formulation components are given in Table 1. The properties of the free rise foams are given in Table 2. The properties of the molded foams are given in Table 3.

TABLE 1

| Formulation/constituents [parts by weight] | Formulations | | | | | | | | | | |
|---|---|---|---|---|---|---|---|---|---|---|---|
| | I | II | IIA | III | IV | IVA | V | VA | VI | VII | VIII |
| Trifunctional Polyether[1] OH number 28 | — | — | — | — | — | — | 90 | 90 | 90 | 90 | 90 |
| Trifunctional polyether[2] OH number 28 | 60 | 60 | 60 | 60 | 60 | 60 | — | — | — | — | — |
| Hexafunctional polyether[3] OH number 28 | 40 | 40 | 40 | 40 | 40 | 40 | 10 | 10 | 10 | 10 | 10 |
| Water | 2.8 | 2.8 | 2.8 | 2.8 | 2.8 | 2.8 | 3.1 | 3.1 | 3.1 | 3.1 | 3.1 |
| Catalyst[4] | 0.15 | 0.15 | 0.15 | 0.15 | 0.15 | 0.15 | 0.15 | 0.15 | 0.15 | 0.15 | 0.15 |
| Catalyst[5] | 0.3 | 0.3 | 0.3 | 0.3 | 0.3 | 0.3 | 0.3 | 0.3 | 0.3 | 0.3 | 0.3 |
| Catalyst[6] | 0.5 | 0.5 | 0.5 | 0.5 | 0.5 | 0.5 | 0.5 | 0.5 | 0.5 | 0.5 | 0.5 |
| Crosslinker 56[7] | 0.5 | — | — | — | — | — | 0.4 | 0.5 | — | — | — |
| Stabilizer KS 43[8] | 0.8 | 0.8 | 0.8 | 0.8 | 0.8 | 0.8 | 0.9 | 0.9 | 0.9 | 0.9 | 0.9 |
| Cell opener 3170[9] | — | — | — | — | — | — | 1.0 | — | — | — | — |
| Amine II (According to the invention) 1,6,11-triaminoundecane | — | 0.2 | 0.4 | — | — | — | — | — | 0.2 | — | — |
| Amine III (According to the invention) 2-(5'-aminopentyl)-azacycloheptane | — | — | — | 0.2 | — | — | — | — | — | 0.2 | — |
| Amine IV (According to the Invention) 1,11-diamino-6-hydroxyundecane | — | — | — | — | 0.2 | 0.4 | — | — | — | — | 0.3 |
| 70% TDI 65 + 30% crude MDI | 36.9 | 36.2 | 36.5 | 36.0 | 36.1 | 36.3 | — | — | — | — | — |
| 20% 2,4'-MDI + 4,4'-MDI + 15% polymeric MDI for an | — | — | — | — | — | — | 54.4 | 54.3(*) | 53.4 | 53.2 | 53.4 |

TABLE 1-continued

| Formulation/constituents [parts by weight] | I | II | IIA | III | IV | IVA | V | VA | VI | VII | VIII |
|---|---|---|---|---|---|---|---|---|---|---|---|
| NCO content of 32.5% | | | | | | | | | | | |

(1)Polyether: trimethylolpropane + 87% PO + 13% EO
(2)Polyether: trimethylolpropane + 83% PO + 17% EO
(3)Polyether: sorbitol + 83% PO + 17% EO
(4)Bis-dimethylaminoethylether
(5)Triethylenediamine, 33% in dipropylene glycol
(6)Bis-dimethylaminopropylformamide
(7)A product of Bayer AG (mixture of diethylene triamine, triethylene tetramine and tetraethylene pentamine)
(8)A product of Bayer AG (polysiloxane stabilizer)
(9)A product of Bayer AG (sorbitol-EO-cellopener)
(*)In this Comparison Test, the absence of the cell opener resulted in contraction of the foams

TABLE 2

| Formulation | I | II | IIA | III | IV | IVA | V | VI | VII | VII |
|---|---|---|---|---|---|---|---|---|---|---|
| Index | 100 | 100 | 100 | 100 | 100 | 100 | 100 | 100 | 100 | 100 |
| Cream time [s] | 5 | 5 | 5 | 6 | 5 | 5 | 6 | 6 | 6 | 6 |
| Gel time [s] | 42 | 42 | 39 | 44 | 41 | 40 | 39 | 39 | 39 | 39 |
| Rise time [s] | 84 | 82 | 79 | 88 | 83 | 80 | 52 | 52 | 53 | 53 |

TABLE 3

| Formulation/tests on 20 liter box molding | I | II | III | IV | V | VI | VII | VIII |
|---|---|---|---|---|---|---|---|---|
| Gross density, DIN 52420 [kg/m³] | 40.0 | 39.6 | 40.2 | 40.3 | 44.4 | 43.2 | 43.1 | 43.7 |
| Compression hardness, DIN 53577 ε = 40% [kPa] | 2.05 | 2.67 | 2.59 | 2.48 | 3.03 | 3.87 | 3.96 | 3.85 |
| Tensile strength, DIN 53571 [kPa] | 65 | 80 | 85 | 80 | 130 | 150 | 135 | 135 |
| Elongation at break, DIN 53571 [%] | 95 | 110 | 120 | 110 | 120 | 140 | 120 | 130 |
| Compression set, | | | | | | | | |
| DIN 53572 ε = 50% [%] | 4.8 | 3.5 | 3.5 | 3.3 | 3.3 | 3.9 | 3.6 | 3.9 |
| DIN 53572 ε = 75% [%] | 6.1 | 4.5 | 4.5 | 4.4 | 4.7 | 5.3 | 5.2 | 4.9 |

When each of Amines II, III and IV were replaced by diamines such as 1,6-hexamethylenediamine or 1,12-diaminododecane in the Formulations given in Table 1 the foam collapsed (this in the same amounts of these amines as in the described examples I, V, VA instead of crosslinker 56).

Table 3 shows that the diaminehydroxy- and triamine alkanes and diaminoalkanes required in the present invention distinctly improve mechanical properties such as compression hardness, tensile strength and elongation at break, for comparable gross densities (Examples II to IV and VI to VIII). This improved behavior is particularly pronounced in the case of 2-(5'-aminopentyl)-azacycloheptane (Amine III) used in Examples III and VI.

The cell-opening effect of the amines required in the present invention is shown in Examples VI to VIII in Table 1 where, despite the absence of a cell opener, non-contracting open foams were obtained. The presence of a cell opener was essential in the case of alkylene polyamines (Example VA). The foams of Examples II to IV could be opened up in fewer steps than the foams of Example I in Table 1.

Table 2 shows that an activating effect results in shortened cream and gel times (Examples IIA and IVA).

In the machine-foaming of the raw material mixtures, the freshly mold-released, still warm moldings showed a considerably reduced amine odor in the case of Examples II to IV and V to VIII by comparison with the prior art. This is of enormous importance above all in regard to industrial hygiene.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of polyurethane (urea) foams in which
   (a) an organic compound having at least two isocyanate-reactive hydrogen atoms and a molecular weight of from 400 to 10,000
   is reacted with
   (b) a polyisocyanate
   in the presence of
   (c) 0.01 to 5.0 parts by weight of a crosslinking agent for every 100 parts by weight isocyanate-reactive compound (a) wherein said crosslinking agent is a difunctional or polyfunctional amine corresponding to the formula

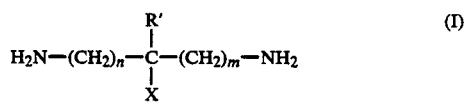

(I)

or

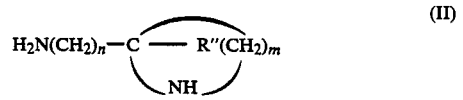

(II)

or a mixture of such amines
in which
   m and n each represents an integer of from 2 to 10,
   X represents an —OH, —NH₂ or —(CH₂)ₘ NH₂ group,
   R' represents hydrogen, a C₁-C₅ alkyl group or

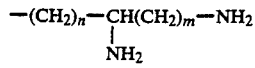
and

R" represents hydrogen,

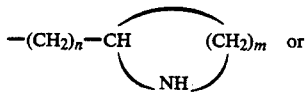  or

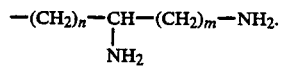

2. The process of claim 1 in which the reaction is carried out in the presence of at least one compound selected from water, organic blowing agents, catalysts, surface active additives, additives for improving flame resistance, and chain extending agents having molecular weights of from 32 to 399.

3. The process of claim 1 in which m and n each represents an integer of from 3 to 8.

4. The process of claim 3 in which R' represents a methyl group.

5. The process of claim 1 in which m and n each represents the integer 5.

6. The process of claim 1 in which R' represents a methyl group.

7. The process of claim 1 in which
R' and R" each represent hydrogen,
X represents —NH$_2$ or —OH and
m and n each represent an integer of from 3 to 8.

8. The process of claim 7 in which X represents —NH$_2$.

9. The process of claim 7 in which m and n each represent an integer of from 4 to 6.

10. The process of claim 1 in which crosslinking agent (c) is used in a quantity of from 0.05 to 0.6 parts by weight for every 100 parts by weight of isocyanate-reactive compound (a).

11. The process of claim 1 in which polyisocyanate (b) is the phosgenation product of an aniline-formaldehyde condensate.

12. The process of claim 1 in which polyisocyanate (b) is a mixture of the phosgenation product of an aniline-formaldehyde condensate and an isomer mixture of 2,4- and 2,6-tolylene diisocyanate.

13. The process of Clai.m 1 in which polyisocyanate (b) is an isomer mixture of 2,4- and 2,6-tolylene diisocyanate.

14. The process of claim 1 in which crosslinking agent (c) corresponds to the formula

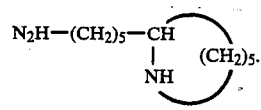

15. The process of claim 1 in which crosslinking agent (c) corresponds to the formula

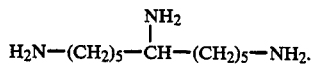

16. The process of claim 1 in which crosslinking agent (c) corresponds to the formula

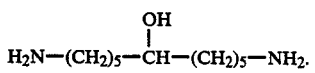

17. The process of claim 1 in which the reaction is carried out in the absence of a known cell-opening agent.

18. A predominantly open-cell polyurethane (urea) foam produced by the process of claim 1.

19. A predominantly open-cell polyurethane (urea) foam produced by the process of claim 2.

* * * * *